April 25, 1950     G. P. KLAAS     2,505,410

VALVE

Filed Jan. 9, 1945

Inventor
Gustave P. Klaas

By Lyon & Lyon
Attorneys

Patented Apr. 25, 1950

2,505,410

UNITED STATES PATENT OFFICE 2,505,410

VALVE

Gustave P. Klaas, Temple City, Calif., assignor to C. F. Braun & Co., Alhambra, Calif., a corporation of California Application January 9, 1945, Serial No. 572,000

8 Claims. (Cl. 251—8)

My invention relates to valves, and among the objects of my invention are:

First, to provide a valve which has a wide variety of uses, being adapted for use with oil, gas, or water.

Second, to provide a valve which may be constructed in the form of a slide valve whether the moving part is disposed externally or internally of the valve body.

Third, to provide a valve which is particularly simple and compact commensurate with its use, and which comprises a minimum number of parts so arranged that they need not be made with extreme accuracy or close tolerances, even though the valve is employed to control relatively high pressures.

Fourth, to provide a valve having large passageways therethrough so that there is no material throttling of the fluids, and the pressure drop across the valve is minimized.

Fifth, to provide a valve having sealing means isolating the various valve passages which are so arranged that they do not pass over ported openings and thereby avoid the wear occasioned by the scraping of the packing or sealing means against the edges of such openings.

With the above and other objects in view as may appear hereinafter, reference is directed to the accompanying drawings in which.

Figure 1:
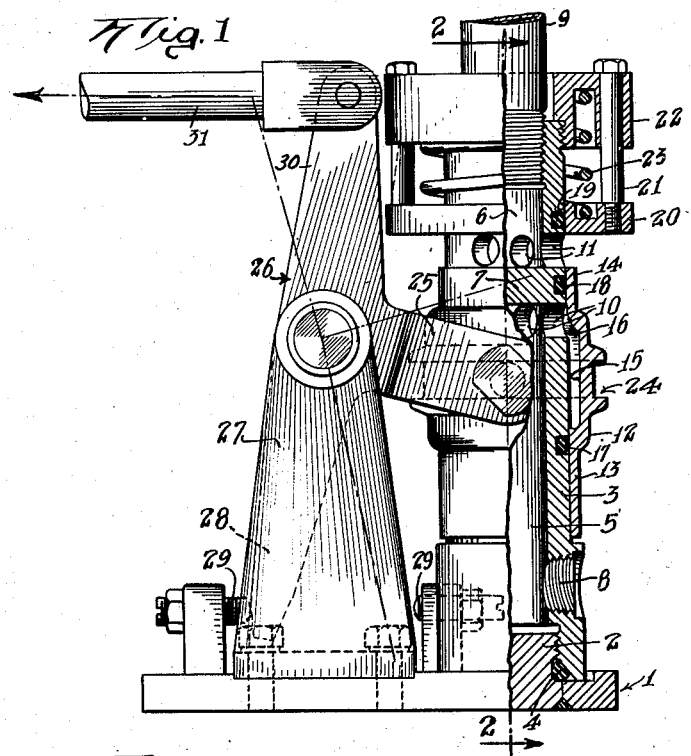
Fig. 1 is a partial elevational, partly sectional view of one form of my valve.

The valve as illustrated in the drawings, is mounted on a base member 1 having a threaded boss 2. A valve body 3 is screw-threaded at its lower end on the boss 2 and a sealing ring 4 is interposed. The valve body is cylindrical and provided with bores 5 and 6 extending therein from its axial extremities. The bores are separated by a partition 7. The lower bore 5 into which the threaded boss 2 fits, is provided with a lateral intake connection 8. A discharge line 9 continues from the end of the upper bore 6.

A series of radial ports 10 is provided adjacent the partition 7 and communicating with the lower bore 5. Similar radial ports 11 are located above the partition 7 and communicate with the upper bore 6.

A sleeve 12 is slidable on the valve body 3. The sleeve 12 comprises lower and upper bearing portions 13 and 14, respectively, separated by an internal channel 15. The upper extremity of the channel 15 merges gradually into the bearing portion 14 forming a cam face 16. The valve body is provided with an annular groove which receives an O ring 17 which is for all positions of the sleeve 12, covered by the bearing portion 13. A similar O ring 18 is fitted in the periphery of the partition 7 and when the sleeve is in its lower position, seals against the upper bearing portion 14. A third O ring 19 fits in a groove formed in a valve body 3 immediately above the radial ports 11. Thus the ports 11 are flanked by the O rings 18 and 19.

A collar 20 surrounds the upper portion of the valve body 3 and normally occupies a position covering the O ring 19. The collar 20 is suspended by guide pins 21 which are slidable in a flange 22 secured to the upper end of the valve body 3. A spring 23 is interposed between the collar 20 and the flange 22, the flange and collar being provided with mating annular recesses to accommodate the ends of the spring.

Figure 2:
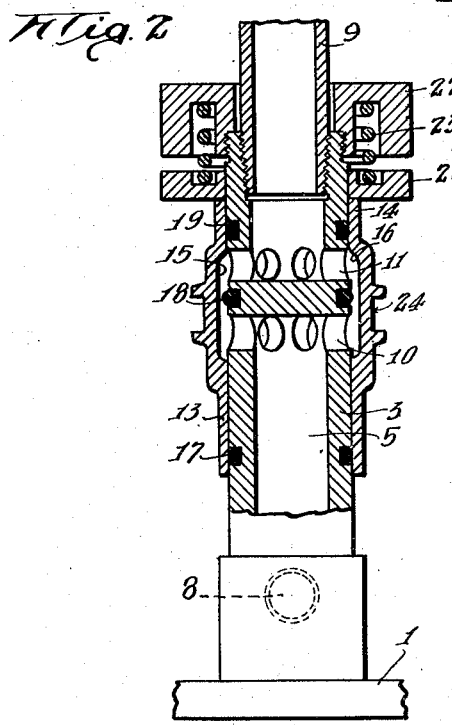
Fig. 2 is a partial elevational, partly sectional view thereof taken through 2—2 of Fig. 1, the valve being shown in the opposite position from that shown in Fig. 1.

The collar 20 is adapted to be engaged by the upper end of the sleeve 12 when the sleeve is moved from the position shown in Fig. 1 to the position shown in Fig. 2. As the sleeve so moves, the collar is thereby pushed clear of the O ring 19 and the bearing portion 14 is substituted therefor. Thus the O ring 19 is always covered either by the sleeve 12 or by the collar 20.

When the sleeve 12 is in its lower position shown in Fig. 1, the O rings 17 and 18 by engagement with the bearing portions 13 and 14, respectively, close the radial ports 10. The radial ports 11 are open. When the sleeve moves into the position shown in Fig. 2, the O ring 17 maintains its sealing relation, the O ring 18 becomes inoperative, while O ring 19 maintains a sealing connection between the body and the sleeve. Flow is therefore possible from the bore 5 outwardly through the radial ports 10 axially along the channel 15 into the ports 11 and out the discharge line 9. The areas of the ports 10 and 11 and the space defined by the channel 15, may be equal to or even greater than the areas of the bores 5 and 6, so that there is no appreciable drop in pressure across the valve.

The sleeve 12 may be operated by any suitable means. In the present instance, the sleeve is provided with an annular groove 24 which coacts with fingers extending inwardly from the arms of a yoke 25 connecting with an operating lever 26. The operating lever may be pivoted on a bracket 27 extending upwardly from the base 1. An arm 28 may extend from the lever and engage a pair of opposed stops 29. Another arm 30 of the lever may be connected to an operating rod 31.

It should be noted that the present construction as illustrated, is a type which has actually been placed in use experimentally, under conditions which did not dictate lightness as a feature; however, it should be observed that the valve lends itself to comparatively light construction, so that if weight is a factor, a valve designed according to my invention is suitable in such instances.

Also, it should be noted that while a three-way valve is shown to illustrate my invention, it of course may be arranged as a four-way valve; also, as a slide valve wherein the sleeve 12 may be fixed, or in other words, constitute the body and the member now functioning as a body, be made slidable therein. Furthermore, while the sealing rings or O rings are shown as set in the body member, at least some of them may be set in the slide or sleeve member.

The essential feature, irrespective of the variations which have been noted, consists in arranging the packing rings so that they do not move across port openings, and are therefore free from the wear inherent in such movement; that is, during upward movement of the sleeve 12, the seal 18 functions until seal 19 is in operation, whereupon seal 18 is uncovered, and during downward movement seal 18 is rendered effective before seal 19 becomes ineffective, but neither seal is caused to move across a ported opening.

Another feature common to the variations which have been noted, consists in the relation of the sliding member, here represented by the sleeve 12, and the collar 20, which substitutes as a cover for a sealing member as the slide member is removed therefrom.

Many other embodiments of the invention may be resorted to without departing from the spirit of the invention.

I claim:

1. In a multiple valve comprising a tubular member arranged for the passage of fluid flow therethrough, means for blocking said flow, a second member slidable relative to said first member, porting means extending radially through said tubular member at each side of said blocking means, said second member having passage means formed therein arranged in one position to interconnect said porting means, and in another position to close the porting means at one side of the blocking means while uncovering the porting means on the other side of the blocking means, packing rings on the exterior of said first member at least adjacent opposite sides of one of the porting means, said packing ring remote from the blocking means coacting with said second member to effect a seal therewith in its one position, said packing means closest the blocking means coacting with said second member to effect a seal therewith in its other position, and a guard member positioned to normally cover the packing means remote from said blocking means when the second member is in its other position, and movable from said packing ring by movement of said second member to said one position.

2. In a multiple valve comprising a tubular member arranged for the passage of fluid flow therethrough, a barrier in the tubular member for blocking said flow, a sleeve member slidable coaxially of said tubular member, porting means extending radially through said tubular member at each side of said barrier, said sleeve member having passage means formed therein arranged in a first position to interconnect said porting means, and in a second position to close the porting means at one side of the barrier while uncovering the porting means on the other side of the barrier, axially spaced packing rings carried on the exterior of said tubular member at least adjacent opposite sides of one of the porting means, said packing ring remote from the barrier coacting with said sleeve member to effect a seal therewith in its first position, said packing ring adjacent the barrier coacting with said sleeve member to effect a seal therewith in its second position.

3. In a multiple valve comprising a tubular member arranged for the passage of fluid flow therethrough, a barrier in the tubular member for blocking said flow, a sleeve member slidable coaxially of said tubular member, porting means extending radially through said tubular member at each side of said barrier, said sleeve member having passage means formed therein arranged in a first position to interconnect said porting means, and in a second position to close the porting means at one side of the barrier while uncovering the porting means on the other side of the barrier, axially spaced packing rings carried on the exterior of said tubular member at least adjacent opposite sides of one of the porting means, said packing ring remote from the barrier coacting with said sleeve member to effect a seal therewith in its first position, said packing ring adjacent the barrier coacting with said sleeve member to effect a seal therewith in its second position, and a guard member positioned to normally cover the packing ring remote from said blocking means when the sleeve member is in its second position, and movable from said packing ring movement of said sleeve member to said first position.

4. In a valve, the combination of a tubular member arranged for the passage of fluid flow therethrough, a barrier in the tubular member for blocking said flow, a second member slidable relative to said first member, first port means extending radially through said tubular member upstream from said barrier, second port means extending radially through said tubular member downstream from said barrier, said second member having passage means formed therein arranged in a first position to interconnect said first and second port means, and in a second position to close the first port means while uncovering the second port means, packing rings on the exterior of said first member at least adjacent opposite sides of the second port means, said packing ring remote from the barrier coacting with said second member to effect a seal therewith in its first position, said packing ring adjacent the barrier coacting with said second member to effect a seal therewith in its second position.

5. In a valve, the combination of a tubular member arranged for the passage of fluid flow therethrough, a barrier in the tubular member for blocking said flow, a second member slidable relative to said first member, first port means extending radially through said tubular member upstream from said barrier, second port means extending radially through said tubular member downstream from said barrier, said second member having passage means formed therein arranged in a first position to interconnect said first and second port means, and in a second position to close the first port means while uncovering the second port means, packing rings on the exterior of said first member at least adjacent opposite sides of the second port means, said packing ring remote from the barrier coacting with said second member to effect a seal therewith in its first position, said packing ring adjacent the barrier coacting with said second member to effect a seal therewith in its second position, and a guard member positioned to normally cover the packing ring remote from said barrier when the second member is in its second position, and movable from said packing ring by movement of said second member to said first position.

6. In a valve, the combination of a tubular member arranged for the passage of fluid flow therethrough, a barrier in the tubular member for blocking said flow, a sleeve member slidable relative to said tubular member, first port means extending radially through said tubular member upstream from said barrier, second port means extending radially through said tubular member downstream from said barrier, said sleeve member having passage means formed therein arranged in open position to interconnect said first and second port means, and in closed position to close the first port means while uncovering the second port means, axially spaced packing rings on the exterior of said tubular member on opposite sides of the second port means, said packing ring remote from the barrier coacting with said sleeve member to effect a seal therewith in its open position, said packing ring adjacent the barrier coacting with said sleeve member to effect a seal therewith in its closed position.

7. In a valve, the combination of a tubular member arranged for the passage of fluid flow therethrough, a barrier in the tubular member for blocking said flow, a sleeve member slidable relative to said tubular member, first port means extending radially through said tubular member upstream from said barrier, second port means extending radially through said tubular member downstream from said barrier, said sleeve member having passage means formed therein arranged in open position to interconnect said first and second port means, and in closed position to close the first port means while uncovering the second port means, axially spaced packing rings on the exterior of said tubular member on opposite sides of the second port means, said packing ring remote from the barrier coacting with said sleeve member to effect a seal therewith in its open position, said packing ring adjacent the barrier coacting with said sleeve member to effect a seal therewith in its closed position, and a guard member positioned to normally cover the packing ring remote from said barrier and movable away from said packing ring by movement of said second member to said open position, and resilient means acting to move the guard member in a direction to cover the packing ring.

8. In a valve, the combination of a tubular member arranged for the passage of fluid flow therethrough, a barrier in the tubular member for blocking said flow, a sleeve member slidable relative to said tubular member, first port means extending radially through said tubular member upstream from said barrier, second port means extending radially through said tubular member downstream from said barrier, said sleeve member having passage means formed therein arranged in open position to interconnect said first and second port means, and in closed position to close the first port means while uncovering the second port means, axially spaced packing rings on the exterior of said tubular member including a first ring adjacent the barrier, a second ring on the opposite side of the second port means from the barrier, and a third ring on the opposite side of the first port means from the barrier, the second packing ring coacting with the sleeve member to effect a seal therewith in its open position, the second packing ring coacting with the sleeve member to effect a seal therewith in its closed position, and the third packing ring coacting with the sleeve member to effect a seal therewith in both positions.

GUSTAVE P. KLAAS.

REFERENCES CITED

The following references are of record in the file of this patent:

UNITED STATES PATENTS

| Number | Name | Date |
| --- | --- | --- |
| 247,668 | Loftus | Sept. 27, 1881 |
| 486,722 | Loss | Nov. 22, 1892 |
| 1,944,739 | Hunt | Jan. 23, 1934 |
| 2,071,204 | Hunt | Feb. 16, 1937 |